United States Patent
Aaron et al.

(10) Patent No.: US 7,890,483 B1
(45) Date of Patent: Feb. 15, 2011

(54) SYSTEMS AND METHODS FOR PROVIDING ALERTS

(75) Inventors: Jeffrey A. Aaron, Atlanta, GA (US); Robert E. Wright, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 596 days.

(21) Appl. No.: 10/675,517

(22) Filed: Sep. 30, 2003

(51) Int. Cl.
*G06F 7/00* (2006.01)

(52) U.S. Cl. .................. 707/705; 340/526; 340/541

(58) Field of Classification Search ............ 707/3, 707/999.003, 705, 758; 348/143; 709/224; 713/202; 726/2
See application file for complete search history.

(56) References Cited

U.S. PATENT DOCUMENTS

| | | | |
|---|---|---|---|
| 5,615,622 A * | 4/1997 | Moses et al. ............... | 109/2 |
| 6,553,378 B1 * | 4/2003 | Eschelbeck ................. | 1/1 |
| 6,867,683 B2 * | 3/2005 | Calvesio et al. ............ | 340/5.52 |
| 6,928,556 B2 * | 8/2005 | Black et al. ................. | 726/6 |
| 7,043,659 B1 * | 5/2006 | Klein et al. ................. | 714/4 |
| 7,043,660 B1 * | 5/2006 | Bolar ........................ | 714/4 |
| 7,620,621 B2 * | 11/2009 | Fuselier et al. ............ | 1/1 |
| 7,734,637 B2 * | 6/2010 | Greifeneder et al. ....... | 707/758 |
| 2002/0053975 A1 * | 5/2002 | Fitzgibbon et al. ......... | 340/541 |
| 2002/0082894 A1 * | 6/2002 | Azuma ...................... | 705/8 |
| 2003/0023722 A1 * | 1/2003 | Vinberg .................... | 709/224 |
| 2003/0069959 A1 * | 4/2003 | Tse .......................... | 709/224 |
| 2004/0024742 A1 * | 2/2004 | Angele ..................... | 707/1 |
| 2004/0148526 A1 * | 7/2004 | Sands et al. ............... | 713/202 |

OTHER PUBLICATIONS

U.S. Appl. No. 10/675,518, Aaron et al.

* cited by examiner

*Primary Examiner*—Robert Timblin
(74) *Attorney, Agent, or Firm*—Myers Bigel Sibley & Sajovec, P.A.

(57) ABSTRACT

A method of outputting an alert indicating that an unauthorized event has occurred. The method includes obtaining a status from a sensor and retrieving personnel information from a database, the personnel information relating to the sensor. The method also includes generating the alert, applying a filter to determine whether to modify a severity of the alert, and outputting the alert.

18 Claims, 4 Drawing Sheets

SYSTEMS AND METHODS FOR PROVIDING ALERTS

BACKGROUND

The present invention is directed generally to various embodiments of systems and methods of providing alerts.

Electronic and mechanical equipment in shared environments such as telecommunication central offices, water purification plants, etc. may be subject to tampering because supervision of the various individuals working in the environments is limited, access to the environments may be required at odd hours, the environment may generally be unstaffed, awareness of each individual's allowed scope of access (e.g. equipment that an individual is allowed to access) may be difficult to determine, and individuals may be able to gain unauthorized access with little or no deterrents once inside the environments.

Many environments have employed closed-circuit television cameras for monitoring purposes. However, often those individuals with visual access to monitors attached to the cameras do not have the information needed to verify whether an individual is authorized to access certain equipment or areas within the monitored environment. Many environments also have access restricted by means of locked doors. However, individuals may obtain unauthorized keys or may defeat such locks by, for example, picking the locks.

If a suspicious event occurs, oftentimes security response personnel or skilled equipment technicians respond manually to the event when alerted. Such manual responses may be costly and may not occur in a timely fashion. In an environment in which responses to events are partially automated, a "fail over" scheme may be employed in which redundant equipment that is configured to be used in case of such an event is activated.

SUMMARY

In one general respect, the present invention is directed in various embodiments to systems and methods for collecting and handling information relating to authorized individuals, their authorized privileges, and their access to equipment and equipment spaces in conjunction with various methods and apparatuses for alerting an individual that another individual's scope of privileges has been exceeded.

In various embodiments, the present invention is directed to a method of outputting an alert indicating that an unauthorized event has occurred. The method includes obtaining a status from a sensor and retrieving personnel information from a database, the personnel information relating to the sensor. The method also includes generating the alert, applying a filter to determine whether to modify a severity of the alert, and outputting the alert.

In various embodiments, the present invention is directed to a system for outputting an alert. The system includes a sensor interface and a database. The system also includes an alert processor in communication with the sensor interface and the database. The alert processor is configured to retrieve personnel information relating to a sensor from the database, generate the alert, apply a filter to determine whether to modify a severity of the alert, and output the alert.

In various embodiments, the present invention is directed to a computer readable medium having stored thereon instructions which, when executed, cause a processor to obtain a status from a sensor, retrieve personnel information from a database, the personnel information relating to the sensor, generate an alert, apply a filter to determine whether to modify a severity of the alert, and output the alert.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE DRAWINGS

Embodiments of the present invention will be described in conjunction with the following figures, which are not drawn to scale, wherein.

DESCRIPTION

Figure 1:
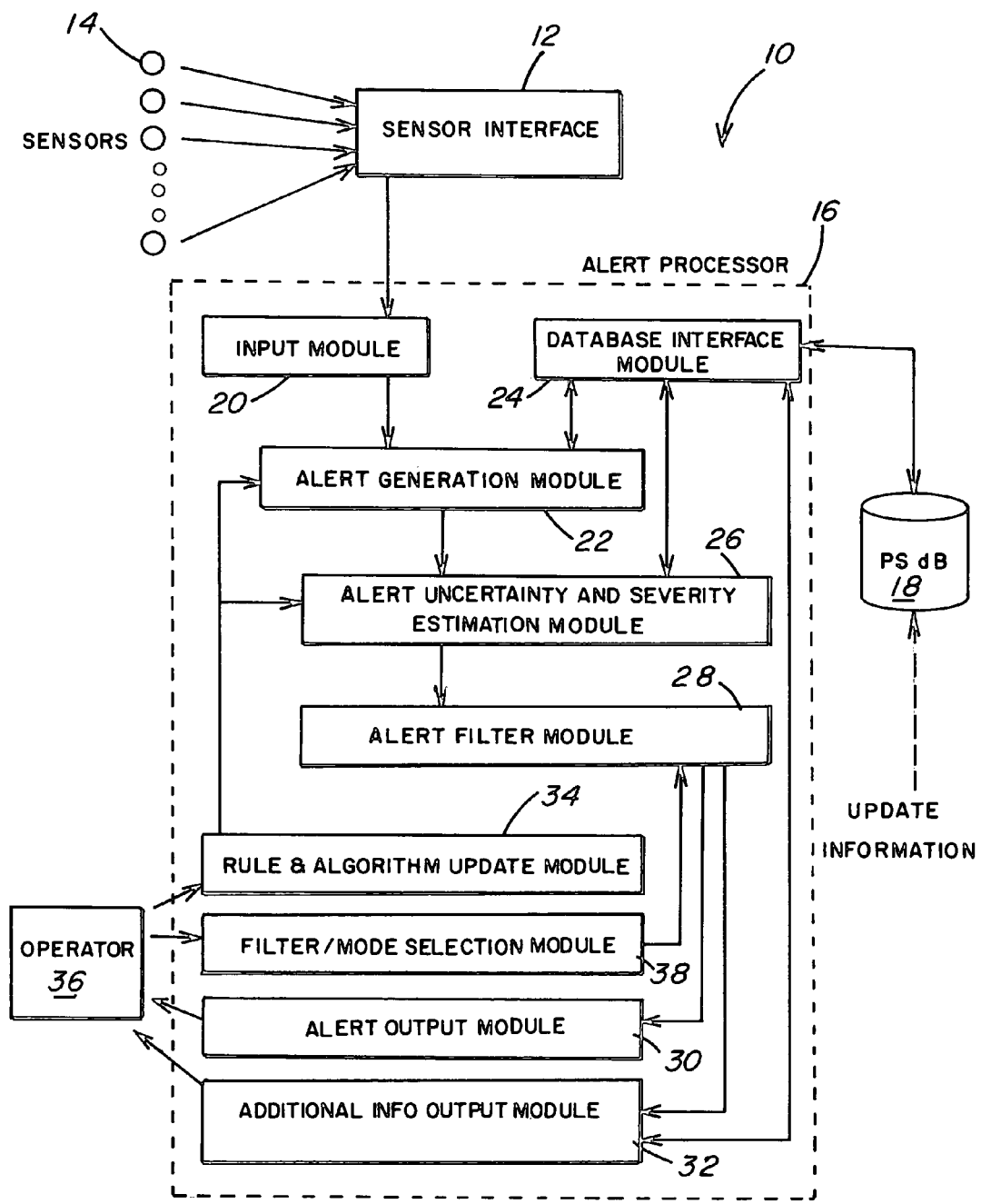
FIG. 1 illustrates various embodiments of a system for providing alerts.

FIG. 1 illustrates various embodiments of a system 10 for providing alerts. A sensor interface 12 may take input from sensors 14. The sensors 14 may be of any type of sensors such as, for example, infrared sensors, physical sensors, motion detection sensors, wireless sensors, audio and/or video pattern recognition devices, card readers, biometric sensors, software monitoring devices, trip wires, electric eyes, pressure sensors, access panel switches, door switches, microwave sensors, System Network Management Protocol (SNMP) trap source/event messages, etc. The sensor interface 12 may build a sensor status data structure (e.g. a data table or matrix or a set of tables/matrices) suitable for input to an alert processor 16. As described herein, the alert processor 16 may form the basis of a mechanism for automatically generating alerts/warnings/alarms indicating that a system or systems is/are potentially under attack (intentional or not) from unauthorized parties or individuals. As used herein, the terms "alert," "warning," and "alarm" mean any type of notification that is given to an individual or machine and may include, for example, telephone messages, electronic messages (e.g. email), pager messages, visual and/or auditory indications, etc. Also, as sometimes used herein in connection with various embodiments, the term "alarm" is used to denote an "alert" that has a severity above a configured pre-set threshold.

A personnel and sensor (PS) database 18 may store information regarding personnel and sensors as described hereinbelow. The sensor database 18 may also store additional information regarding dealing with various alerts/alarms that may be generated by the alert processor 16.

The alert processor 16 may include an input module 20. The input module 20 may take sensor status information from the sensor interface 12, reformat the information to a form needed by the alert processor 16, and provide the re-formatted information to an alert generation module 22.

The alert generation module 22 may take as input the information provided by the input module 20 to query the PS database 18 via a database interface module 24. The alert generation module 22 may receive the returned lookup information from the database 18 and generate a set of, for example, all potential alerts/alarms resulting from the inputted sensor status information.

The database interface module 24 may receive queries from various alert processor 16 modules. The database interface module 24 may then look up and retrieve the requested data from the PS database 18 and return the data associated with each query to the respective module making that query. The database interface module 24 may interpret queries, connect to the database 18 as required, re-format data obtained from the database 18 to whatever format is needed by the requesting modules, and return the properly re-formatted data to the correct module.

An alert uncertainty and severity estimation module 26 may receive as input the set of potential alert/alarms from the alert generation module 22. The alert uncertainty and severity estimation module 26 may estimate the uncertainty and severity associated with each alert/alarm and may provide the set of alerts/alarms with an uncertainty and severity included for each to an alert filter module 28. The alert uncertainty and severity estimation module 26 may obtain data (via the database interface module 24) from the PS database 18 in order to make such estimates.

The alert filter module 28 may receive as input the alerts/alarms with uncertainty and severity provided by the alert uncertainty and severity estimation module 26 and may apply filters to determine a final set of alerts/alarms that will actually be outputted by the alert processor 16.

An alert output module 30 may receive as input a final set of alerts/alarms, with uncertainty and severity included, and may re-format and output each of these to a recipient via a communications device or devices (not shown) associated with each recipient.

An additional info output module 32 may receive as input the final set of alerts/alarms from the alert filter module 28, with uncertainty and severity included. The additional info output module may retrieve (via the database interface module 24) additional information related to dealing with the alerts/alarms, and may re-format and output the additional information as appropriate to the configured recipients via the communications device or devices associated with each recipient.

The rule & algorithm update module 34 may be used by an operator 36 (e.g. a computer device) to review and modify various rules and algorithms used by the alert generation module 22 and the alert uncertainty and severity estimation module 26. Input from the operator 36 may be, for example, manual (e.g. via keyboard/monitor/mouse), via an electronic storage device (e.g. via diskette, tape, CD-ROM, DVD-ROM, USB drive), via a software application (e.g. a separate interfaced software program designed to provide algorithm & method input into the alert processor 16), etc. The rule & algorithm module 34 may have control outputs that connect to the alert generation module 22 and the alert uncertainty and severity estimation module 26.

A filter/mode selection module 38 may be used by the operator 36 to review and modify the filters and mode(s) used by the alert processor 16. The filter/mode selection module 38 may interface to the alert filter module 28 and, in various embodiments, to other modules to control the filtering and operating modes of the alert processor 16.

Figure 2:
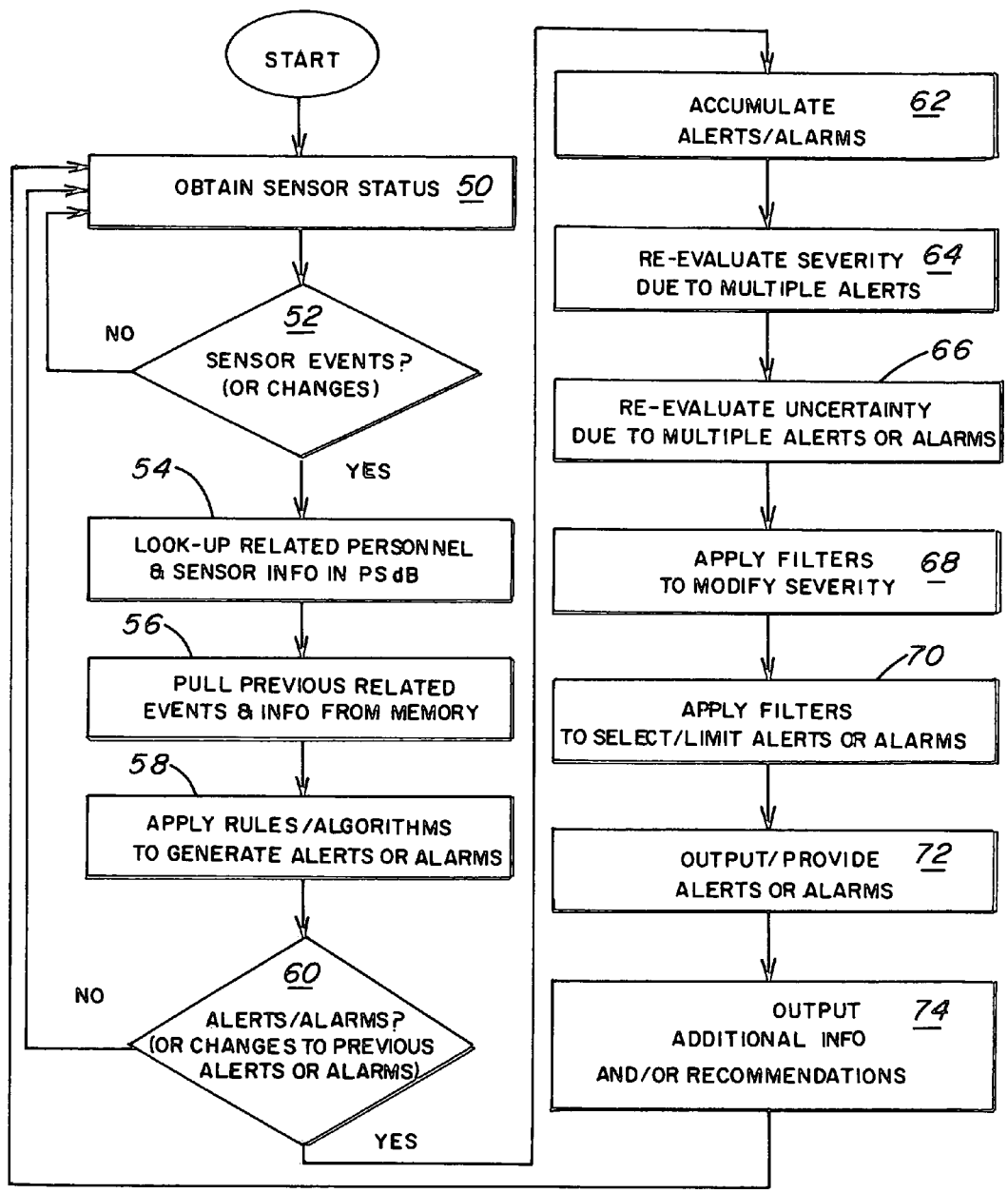
FIG. 2 illustrates various embodiments of a process for providing alerts.

FIG. 2 illustrates various embodiments of a process for providing alerts. The process illustrated in FIG. 2 may be performed in various embodiments by, for example, the alert processor 16. Prior to the commencement of the process shown in FIG. 2, the sensor interface 12 may be interfaced to the sensors 14. At step 50, the sensor interface may, for example, either continuously or periodically in short intervals, store a summary form of the status of all the sensors 14. The status may be stored in, for example, a table or matrix with each row corresponding to a sensor and each column corresponding to a time snapshot, and various entries corresponding to status. Thus, in various embodiments, in order to allow examination of changing trends in sensor status, the status of the sensors 14 may be maintained in the table for a period of time and not just for one single time instance. The sensor status may be examined by the alert processor 16 at step 52 to determine if sensor events, or changes in sensor status, have occurred.

Subsequent steps in the process may determine whether various events are "allowed" or are "not allowed." Personnel who are accessing, for example, zones for which they are not authorized may trigger an alert, just as may other events that are not allowed such as, for example, if an individual accesses a piece of equipment for which they are not authorized to access, if an individual presses buttons on a piece of equipment or disconnects cables or other equipment, opens a cabinet door, etc. As used herein, the term "zones" is not intended to encompass just physical areas. In various embodiments, zones may be "virtual" areas. Thus, for example, zones may consist of a single item or a combination of various items such as a system (e.g. a communications or data network), a system element (e.g. a data router or switch), a physical location (e.g. a central office or other network provider facility), a physical area (e.g. a particular area inside a facility), a date/time (e.g. weekends), a personnel category (e.g. maintenance technician), etc. Other items may be included to define the zones as desired. For example, any item that is determinable/measurable and can be used to add further specificity may be included. Zones may be "large" and correspond to a virtual area that includes multiple items (e.g. a set of data routers). Also, zones may be as small as desired (e.g. a single data router or a single module on a data router). The limit of a zone's specificity may be determined by the placement and type of sensors installed and in such embodiments zones may be defined in relation to sensors that can determine when they are accessed and by whom.

The personnel and sensor database 18 may be provisioned with information relating to personnel and sensors and, thus, when a sensor event or change is detected at step 52, at step 54 personnel and sensor information that is related to the event or change may be retrieved from the personnel and sensor database 18. Personnel information may include such items as, for example, name, identifying numbers (e.g. employee number or social security number etc.), identifying physical characteristics (e.g. height, weight, hair/eye color, retinal scan, fingerprint scan, voice scan, etc.), category (e.g. maintenance technician, supervisor, etc.), authorized access zones (e.g. identified or named by numbers and letters in the same fashion as for the sensors 14), and any further items as desirable. Sensor information may include such items as, for example, type (e.g. motion sensor, card reader, biometric sensor, trip wire, electric eye, pressure sensor, access panel switch, door switch, microwave sensor, pattern recognition closed-circuit TV, Simple Network Management Protocol (SNMP) trap source/event message, etc.), location (e.g. exact door location, exact access panel location, IP address, VLAN ID, VPN identifier, sensor group number, etc.), various characteristics (e.g. trigger threshold, reliability, false alarm rate, failure rate, etc.), zone information (e.g. named zone of which the sensor is a member, named zone which this sensor defines, etc.), and any further items as desired.

A list of zones may be provided via database operations on the sensor information in the PS database 18. The list may be updated and displayed periodically. However, in various embodiments the zones may be defined and provisioned with the sensor information inputted into the PS database 18. Zones that cannot be supported by existing sensors may be marked as "desired" in various embodiments, i.e. they do not actually exist until sensors are provided to implement them. Also, a list of authorized zones (and other information) may be provided via database operations on the personnel information in the PS database 18.

At step 56, previous related events and personnel and sensor information may be retrieved from the PS database 18. Such information may be used at step 58 to generate possible alerts/alarms.

Upon identifying and authenticating access to a facility, a person may be identified to the alert processor 16 via sensor information (e.g. via specific identifying information in an access card swiped through a card reader at an entrance door etc.). The information may be stored in the PS database 18, thus initiating and building a tracked-access list so that subsequent accesses within that facility can be tracked as being associated (either with, for example, 100 percent certainty or with varying lesser levels of certainty) with that specific person. If no one else is present in the facility, or if the facility has definitive means to maintain the identification of the person as they move through the facility, then the person may be tracked with 100 percent certainty. If the sensors 14 that provide information to the alert processor 16 are less accurate and multiple personnel are present in the facility, or if other circumstances are present that cause the identity of a person triggering a sensor 14 to be in doubt (e.g. an extended time period between the triggering of sensors 14 that may or may not be capable of providing specific identity), then the person may still be tracked, but with less certainty. Various algorithms may be used to assess certainty at step 58 when the alert processor 16 applies rules and algorithms to generate alerts/alarms and at step 60 when the alert processor determines whether to issue the alert/alarm (or changes to a previous alert/alarm). For example, decreasing certainty at various rates of slope depending on the number of other people present and adjusting certainty upward when identifying events occur may be used. Tracking certainty may be increased by the use of sensors that can provide specific identity (e.g. access card readers, etc.). Tracking certainty may be increased to 100 percent for the exact moment of sensor triggering, although it subsequently may decline gradually over time (or precipitously if a large number of personnel are present in or enter the area).

By accessing the PS database 18, the alert processor 16 may determine whether a person has accessed a zone for which they are authorized. This may be accomplished by determining the intersection of an identified person and the zone(s) associated with triggered sensors indicating that person's access or potential access. For sensor events that indicate access to an authorized zone (e.g. a zone for which the person has permission to access), no alerts may be triggered. For sensor events that indicate access to an unauthorized zone, one or more alerts may be triggered. The alert mode and level may be determined based on, for example, the pertinent aspects of the event, including, for example, the type of sensor, the personnel category, the date/time, the zone violated, etc. Modes and levels may be defined as needed to allow for variation in the alerts generated and for different levels of potential severity. These may be assembled in the alert processor 16 and processed by one or more algorithms that may involve, for example, one or more of the following: simple intersection of items, application of if/then rules, look-ups in a result table based on input items, etc. Rule and algorithm provisioning and update may be accomplished offline.

In order to calculate the decrease of alert certainty over time and subsequently accomplish alert determination, the following example algorithms may be used.

Alert certainty C decreases as a function of time t via:

$$C(t)=C_0-(S\times t) \text{ when } (C_0-(S\times t)) \text{ is positive;}$$

otherwise C(t)=0.

Where $C_0$ is the initial certainty (e.g., at time of initial sensor detection), And S is a pre-configured slope value which may be unique for each zone ($S_{zone}$) or each sensor type ($S_{type}$), but note that if multiple sensor types are associated with a given zone, then S can be the average value of the different sensor type $S_{type}$, or more conservatively S can be the largest $S_{type}$), and the uncertainty U(t)=100−C(t), with both C(t) and U(t) being in the range of zero to 100 much like any typical percentage value.

In order to determine alerts or the condition of a potential alert, the following example algorithm may be used:

A given zone Z=the intersection of $\{F_{Z1}, F_{Z2}, F_{Z3}, \ldots\}$

Zone accessed? [yes or no]=the intersection of Z with $\{F_{D1}, F_{D2}, F_{D3}, \ldots\}$ Where $F_z$ are factors defining a particular zone Z as indicated above, And $F_D$ are similarly the factors detected by sensors or otherwise determined for a particular individual P A non-zero intersection (i.e., an intersection occurs) indicates "yes, the zone has been accessed.

Alert needed? [yes or no]=(P authorized for Z ?) AND (certainty C(t) exceeds T)

Where T is a pre-configured threshold being in the range of zero to 100 and may be set, for example, universally, by zone, by person, or in any feasible combination.

At step 62, if an alert/alarm or a change to an alert/alarm may be warranted, the alert/alarm may be accumulated with other alerts/alarms in a suitable database such as the PS database 18. At step 64, the severity of the alert/alarm may be re-evaluated if multiple alerts/alarms were generated for, for example, the same or an adjoining zone. The severity may be increased, for example, if multiple alarms/alerts were generated. At step 66, the uncertainty of the whether the alert/alarm should issue may be re-evaluated based on whether multiple alerts/alarms were generated for, for example, the same or an adjoining zone. The certainty may increase, for example, if multiple alarms/alerts were generated.

In order to accomplish alert severity modification, the following example algorithm may be used:

$$S_{mod}=S_0(G\times N_{same})+(H\times N_{adjacent})-(I\times(100-C(t)))$$

Where $S_{mod}$ is the modified alert severity, $S_0$ is the baseline pre-configured severity associated with a given alert, G, H, and I are pre-configured modifier values, $N_{same}$ in the number of alerts in the same zone within a given pre-configured time window, $N_{adjacent}$ is the number of alerts in all adjacent zones within a pre-configured time window, C(t) is the certainty value for the given alert.

Note that G, H, and I can be chosen as desired for greater or lesser modification of severity and greater or lesser modification sensitivity to $N_{same}$, $N_{adjacent}$, and C(t). Also, "adjacent" in conjunction with $N_{adjacent}$ can have the meaning associated with being physically adjacent, logically adjacent, or any other feasible and desirable meaning, or and combination of meanings as feasible and desirable.

Filters may be applied at steps 68 and 70 to allow for, for example, greater operating flexibility and convenience. Filters may be used to modify the generation of alerts in any manner desired, using as selection criteria the aspects of an event in any combination desired, and affecting the alerts in terms of, for example, mode (e.g. the mode can be changed), severity (e.g. the severity level can be increased or decreased by any increment at step 68), and whether the alerts are in fact generated at all (e.g. the alert, which is in the process of being generated, can be nullified or limited at step 70).

Alerts may be outputted at step 72 with an appropriate security level (severity) and likelihood. If it is absolutely certain that the alert is valid, then the likelihood is 100 percent. If it is probabilistically less certain that the alert is valid (e.g. the reliability of the sensor 14 is low or the identification of the specific technician is less than certain), then the likelihood may have a lower value. Mathematical laws of probability may be used to calculate the resulting likelihood, given as input all of the various factors with less than 100 percent certainty.

Alerts may be provided in any form that is useful to operators, monitoring personnel, and/or specific individuals who may be, for example, at remote locations. Alert forms may include, for example, audible alerts (e.g. alarms which are heard), visible alerts (e.g. warning indicators), display alerts (e.g. computer monitors), or any other means of alerting (e.g. email, paging, electronic computer-to-computer, text messaging, voice messaging including cell-phone calls using computer-generated voice capabilities, etc.).

At step 74, additional output may be provided. This may include, for example, suggested actions, fixes, and checks associated with one or more alerts. In various embodiments, alerts may not indicate problems with absolute certainty and helpful information may be presented to the operators that is of significant value in terms of verifying the alert and taking remedial actions. Such information may be retrieved from the PS database 18 if so provisioned or from another database so provisioned.

Figure 3:
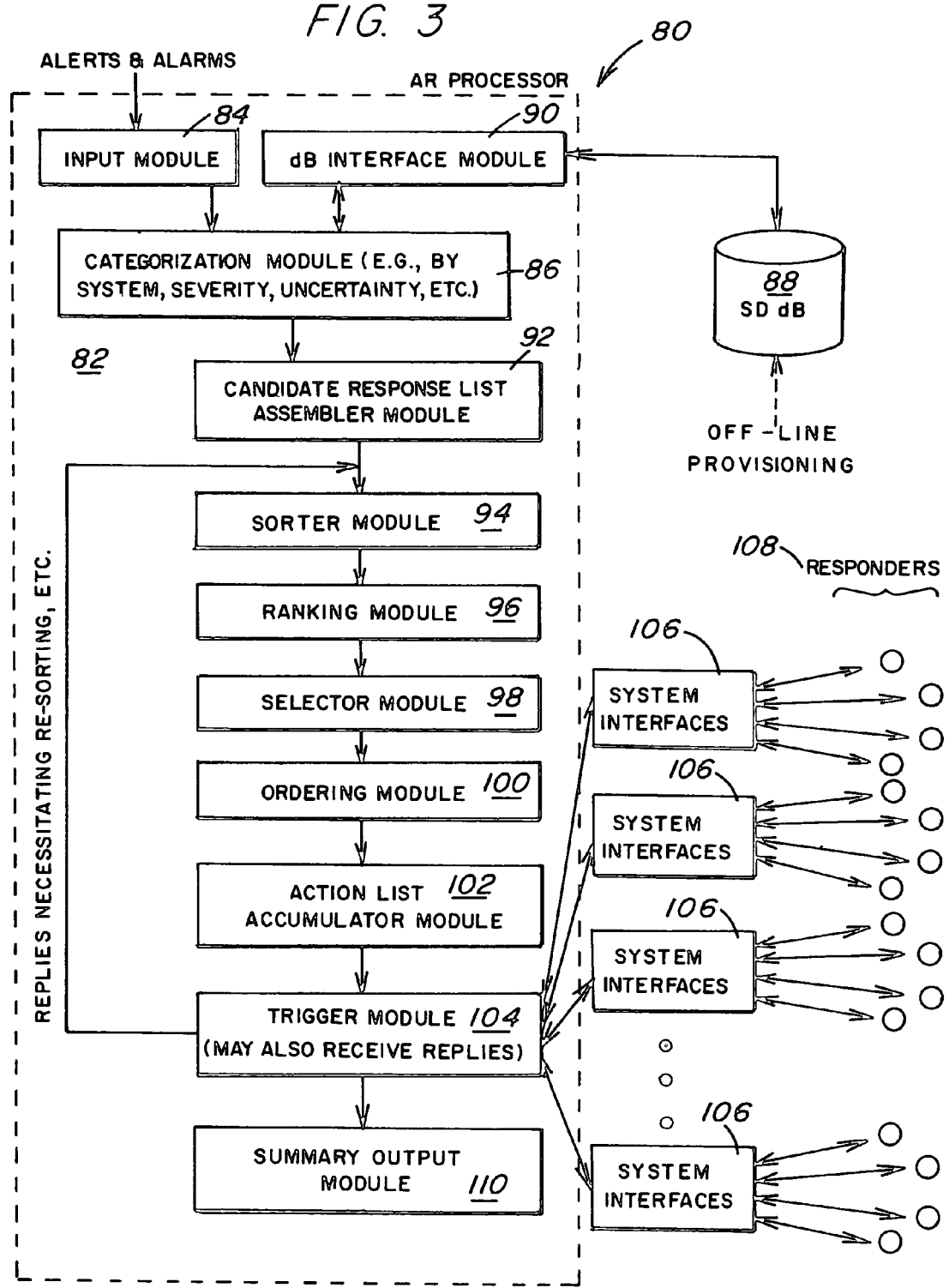
FIG. 3 illustrates various embodiments of a system for reacting to alerts.

FIG. 3 illustrates various embodiments of a system 80 for reacting to alerts that are issued by, for example, the alert processor 16 of FIG. 1, manual alerts that are entered by, for example, an operator, electronically-issued alerts that are input automatically, etc. The system 80 may include an auto-responder, or auto-reactive, (AR) processor 82. The AR processor 82 may include an input module 84. The input module 84 may take alert/alarm information in whatever form is used, reformat the information to the format needed by the AR processor 82, and provide the re-formatted information to a categorization module 86. The alert/alarm information may include, for example, associated severity and uncertainty information and other associated information.

The categorization module 86 may take as input the alert/alarm information provided by the input module 84, retrieve relevant information as needed in a system descriptive (SD) database 88, and categorize the alerts/alarms by various parameters that may include, for example, system affected, system originating the alert/alarm, severity of the alert/alarm, uncertainty of the alert/alarm, etc. Various algorithms and methods may be used to estimate severity and uncertainty, examples of which are described hereinabove. In cases where the alerts/alarms include associated information such as severity and uncertainty, the categorization module 86 may utilize such information.

A database interface module 90 may take queries from the various AR processor 82 modules (e.g. the categorization module 86), retrieve the requested data from the SD database 88, and return the data associated with each query to the respective module making the query. The database interface module 90 may interpret queries, connect to the database 88 as appropriate, re-format data obtained from the database 88 in whatever form is needed by the modules, and return the re-formatted data to the correct module.

A candidate response list assembler module 92 may take as input the categorized alerts/alarms and associated SD database 88 information provided by the categorization module 86 and determine candidate responses by eliminating redundant responses from the database information and, in various embodiments, by any appropriate algorithms and methods used to determine candidate responses.

A sorter module 94 may take as input the alerts/alarms, candidate response list, and SD database information provided by the candidate response list assembler module 92 and may sort the candidate responses into sets of actions (e.g. associated with particular sub-systems or components of the affected systems).

A ranking module 96 may take as input the alerts/alarms, sorted candidate response list, and SD database information provided by the sorter module 94 and may rank the candidate actions in terms which may include, for example, expected effectiveness, time priority, pre-configured importance (e.g. base on the importance of the system affected), etc.

A selector module 98 may take as input the alerts/alarms, sorted and ranked candidate response lists, and SD database information provided by the ranking module 96, and may select the actual group of actions to be taken (e.g. by eliminating candidate actions that are low in rank or associated with a sub-system or system component that is low in importance).

An ordering module 100 may take as input the alerts/alarms, sorted and ranked and selected candidate response lists, and SD database information provided by the ranking module 96, and may place the actions in a time sequence.

An action list accumulator module 102 may take as input the alerts/alarms, sorted and ranked and selected and ordered candidate response lists, and SD database information provided by the ordering module 100, and may accumulate the responses into a final response list until all the alerts/alarms that may be associated together (e.g. until a timer has expired and/or until all alerts/alarms associated with a particular system are accounted for) are processed into candidate responses.

A trigger module 104 may take as input the alerts/alarms, final accumulated candidate response list, and SD database information provided by the action list accumulator module 102, and may provide control inputs to system interface(s) 106 associated with the affected system(s). The trigger module 104 may also receive replies from the system interface(s) 106 originating from actual responder(s) 108 coupled to or into the affected system(s). If those replies are satisfactory, the trigger module 104 may provide the results to a summary output module 110. If any replies are not satisfactory or exceed the allowable range of replies in any significant manner (as has been pre-configured or is included in the database information associated with the alerts/alarms and the system affected), the trigger module 104 may provide all the associated information and results to the sorter module 94 for re-determination of the response list. If such an action continues past a pre-configured number of tries, a failure message may be sent to an operator (not shown) and any other configured recipients.

The summary output module 110 may take as input the final set of actions taken, with any associated results reported from the responders, and may re-format and output each of these as needed to the configured operators or recipients via a configured technical communications device or devices associated with each operator or recipient. The summary output may be presented in near real-time (e.g. via email or pager) and/or non-real-time (e.g. periodic summaries emailed or mailed as configured), and the choice of delivery method may be determined, for example, based on the type of alerts/alarms and/or the types of actions taken (e.g. using pre-configured rules).

The system interfaces 106 may couple the AR processor 82 to the affected systems, and may couple to the responders 108 associated with each system. The system interfaces 106 may translate control information sent from the AR processor 82 into appropriate control signaling for the responders 108, which may vary in type and design. The system interfaces 106 also may translate reply signaling from the responders 108 into appropriate replies to be sent back to the AR processor 82.

The responders 108 may couple the system interfaces 106 to the affected systems and may implement the actions in the response list generated by the AR processor 82. The responders 108 may also monitor the results of the implemented actions taken in the affected systems and may monitor other aspects of the affected systems so as to be able to reply with result and other information to the AR processor 82 after actions are taken.

The SD database 88 may store information related to the various affected systems, including, for example, types of potential alerts/alarms, types of system components and sub-systems and associated parameters, various candidate actions and potential results of those actions, rules for determining importance and ranking of candidate actions, parameters of candidate actions including those usable for sorting and selection and ordering, types of responders, parameters of responders including those usable for triggering actions, potential replies from responders, classification of responder replies as satisfactory or non-satisfactory, operators of affected systems, recipients of summary information, etc.

As described hereinabove in connection with FIG. 3, the AR processor 82 may automatically provide remedial actions to a system or systems experiencing problems or (currently or previously) under attack by unauthorized parties. The responders 108 placed in the system may be controlled by the AR processor 82 in order to effect this capability. Using the example of a data network, actions that might be taken may include, for example, (a) forcing a fail over to an unaffected redundant router or other system element, (b) re-initializing the affected element's configuration, (c) re-loading a previously-saved configuration, (d) monitoring for certain suspected changes in network/system operation, (e) re-routing according to pre-configured routing tables or algorithms, (f) changing firewall rules or rule-sets, or (g) disabling the element or even a portion of the network. Certain actions or sets of actions may be self-contained and not require operator attention. Others, for example, may require extreme actions such as disabling elements or sub-systems and may be temporary and may be followed-up by operator or administrator actions to complete the remediation.

Figure 4:
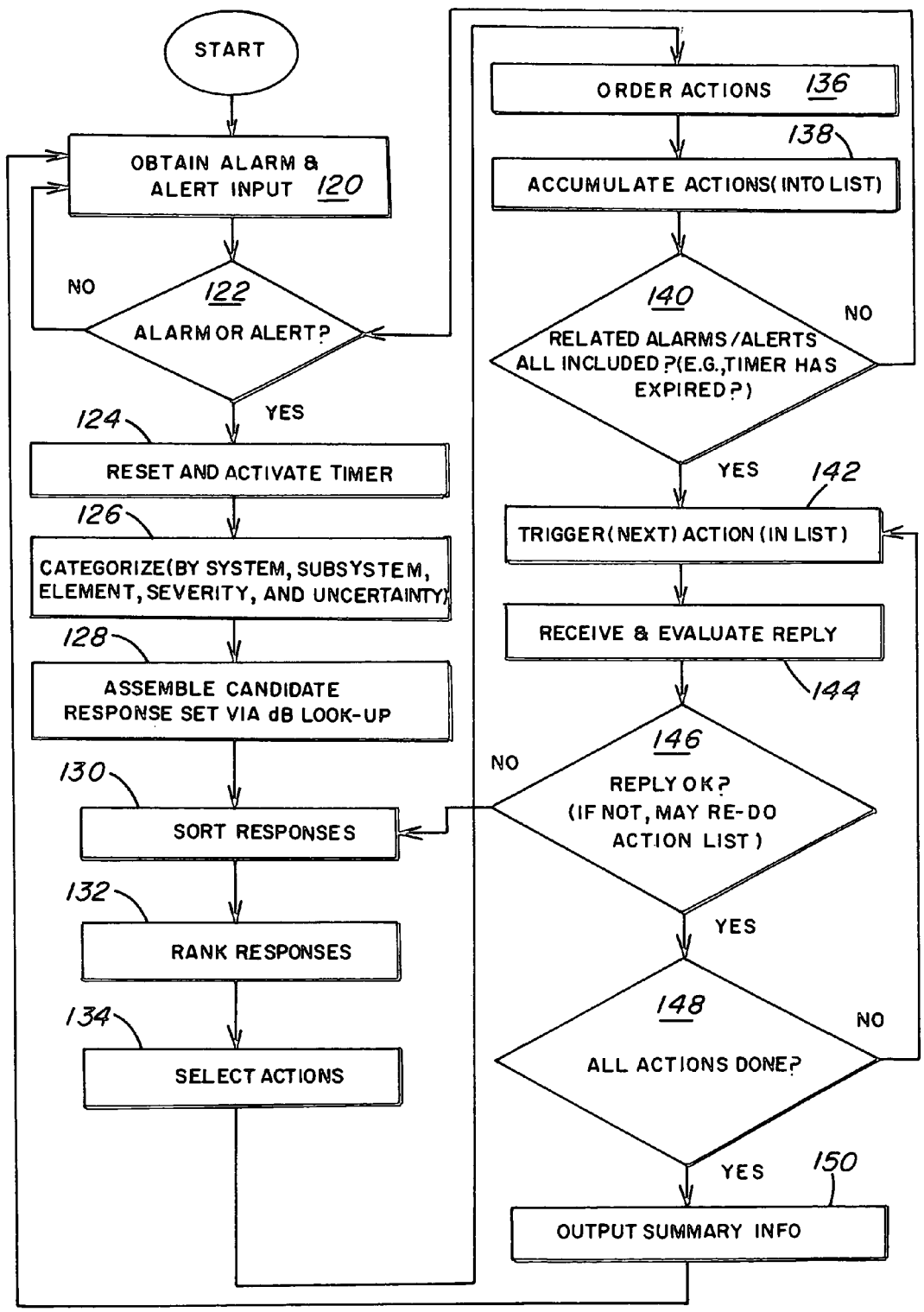
FIG. 4 illustrates various embodiments of a process for reacting to alerts.

FIG. 4 illustrates various embodiments of a process for reacting to alerts. The process illustrated in FIG. 4 in various embodiments may be performed by, for example, the AR processor 82. At step 120, the AR processor 82 may examine all manual and electronic inputs regarding alert conditions. Such inputs could come from multiple sources, including, for example, manual inputs from monitoring personnel on watch, electronic inputs from alerting systems, and "traps" (e.g. event messages) from system management mechanisms (e.g. SNMP trap messages from data network equipment). Such inputs may contain information indicating the system (or sub-system) potentially affected, the type and severity of alert, etc.

At step 122, the AR processor 82 may determine whether the information includes alert/alarm information. At step 124, the AR processor 82 may reset and activate a timer that may be used in subsequent process steps. At step 126, the AR processor 82 may categorize received alerts/alarms by, for example, system, sub-system, element, severity, uncertainty, etc.

At step 128, the AR processor 82 may obtain and examine the alert input information and determine relevant actions (i.e. candidate responses) by retrieving data from the SD database 88. The SD database 88 may contain pre-provisioned lists of appropriate actions for each type of alert/alarm. For some alerts, in various embodiments only one action or type of action may be appropriate, and this may be retrieved from the SD database 88 and placed into a tentative action list. For alerts that may elicit a variety of possible actions, the AR processor 82 may contain if/then rules and/or other algorithms to help select from a set of multiple appropriate actions. In various embodiments, the set of multiple actions may be retained by the AR processor 82 in case revision of the tentative action list becomes necessary or desirable. In various embodiments, the AR processor 82 may keep track of the SD database 88 accesses so that it may re-retrieve the set of multiple actions if required.

Once a group of tentative actions, or candidate responses associated with the received alert/alarm is determined, the AR processor 82 may (1) sort (step 130), (2) rank (step 132), (3) select (step 134), and (4) order (step 136) the relevant actions. As used herein, "sorting" refers to grouping the actions into those intended for the various affected systems and sub-systems. Ordering may be accomplished by having a range or set of numbers associated with each action. Various embodiments use such a scheme in an analogous manner to that in which IRS forms are assigned an ordering number that filers can use to assemble tax returns into the proper order for submittal. Pre-provisioned with such numbers for sorting, ranking, selecting, and ordering, the actions may be built into a final actionable list by the AR processor 82. In various embodiments, the AR processor 82 may take into account actions that should be taken before (or after) other actions, conditionally upon their presence in the list. By having "ranking numbers" as well as well as "ordering numbers" associated with each action, it may be possible to support conditional rules of ordering so that ordering numbers apply directly unless actions are present that have higher or lower ranks, in which case ordering numbers may be adjusted (lower or higher, as appropriate) by the other ranks present. Also, selection may be aided by "type numbers," such that if more than one action of the same type is present in the list, the AR processor 82 may determine if any of those actions can be deleted (e.g. so that the same type of action is not taken redundantly for the same sub-system).

Various embodiments may utilize other methods and algorithms for sorting, ranking, selecting, and ordering. Such methods and algorithms may include, for example, methods for choosing subsequent actions based on responses obtained in connection with previous actions (such that a course of action may be automatically implemented that incorporates intermediate feedback from the system being acted upon conditional upon various conditions).

Placing the actions into the proper order builds a generic action list at step 138 that may be exercised once it is made specific. At step 140, the AR processor 82 may determine whether related alarms/alerts are included in the list. If not, the process may return to step 122. If all related alarms/alerts are included in the list, the process may advance to steps 142, 144, 146 and 148 where, one by one, the AR processor 82 may trigger the actions in the final specific action list, thus monitoring any responses from the affected system(s) and looping back to the trigger step 142 until all actions have been triggered. In various embodiments, if system failure responses are received, further actions may be cancelled.

As described hereinabove in connection with FIG. 3, the AR processor 82 may be interfaced to the affected systems and responsive entities within those systems as needed. The associated interfaces (e.g. IP Network Interface Cards) may include hardware, software, and connectivity as required to communicate with the responders 108 to send information triggering the responders 108 to various actions and to receive result-related information from the responders 108 in turn.

Actions may thus be triggered and responses may be generated via the responders 108 present within the affected system(s). The responders 108 may be the elements of a system that can react to actions triggered by the AR processor 82. In various embodiments, the responders 108 may be capable of sending messages back to the AR processor 82 to indicate their responsiveness and the outcome of the action (from their perspective). In various embodiments, the responders 108 (e.g. special-purpose equipment, routers, switches, etc) may be added to the systems to provide the needed response capabilities. In various embodiments, the responders 108 may be present in basic form (e.g. existing data routers) but need software modifications or additions (e.g. added software modules or operating system upgrades) to provide the required functions.

The SD database 88 information may include, for example, for each system, the identity (e.g. numeric identifier, name, IP address), type (e.g. data router software module, responder functional category, capabilities description), location (e.g. system, sub-system, system element, element module) of each responder 108, etc. As discussed hereinabove, for each responder 108 the SD database 88 may include potential associated actions and possible results associated with those actions. Such data in conjunction with the SD database 88 location information for the responders 108 and limited functional and topological information describing the systems being monitored may allow the AR processor 82 to find the appropriate responders 108 to which to communicate the appropriate actions for a given system. In various embodiments, the final action list may be first formulated in general terms and then made specific by associating each action with a specific responder 108. Such a process may undergo a number of iterations (e.g. when a specific responder 108 is needed to implement the action list but is not present/active or does not have the exact required capabilities, in which case the capabilities of the existing responder 108 may be used to modify the action list, in effect re-finalizing the action list).

Subsequent to all actions in the action list being implemented, at step 150 a summary output may be displayed by the AR processor 82 to the operators that includes the action (and response) data plus any additional information. In various embodiments, the additional information may include suggested actions, fixes, and checks associated with one or more actions/responses. In various embodiments, the actions/responses may not completely handle problems with absolute certainty and thus helpful information may be presented to the operators to assist in verifying the actions/responses and taking additional remedial actions if needed. Such additional information may be retrieved from, for example, the SD database 88 if so provisioned or from another database so provisioned.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary.

As used herein, a "computer" or "computer system" may be a wireless or wireline variety of a microcomputer, minicomputer, laptop, personal data assistant (PDA), cellular phone, pager, processor, or any other computerized device capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention.

It should be appreciated that all the figures are presented for illustrative purposes and not as construction drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A method of outputting an alert indicating that an unauthorized event has occurred, the method comprising:
  obtaining a status from a sensor;
  retrieving personnel information comprising identity and status information for personnel from a database, the personnel information relating to the sensor;
  generating the alert;
  applying a filter to determine whether to modify a severity of the alert;
  evaluating the severity of the alert to generate a modified alert severity $S_{mod}$ when it is determined to modify the severity of the alert; and
  outputting the alert;
  wherein $S_{mod}=S_0+(G*N_{same})+(H*N_{adjacent})-(I*(1-C(t)))$;
  $S_0$ is a preset severity associated with the alert;
  G, H, and I are preset constants;
  $N_{same}$ is a number of alerts in an access zone within a preset time window;
  $N_{adjacent}$ is a number of alerts in access zones adjacent to the access zone within the preset time window; and
  C(t) is a certainty associated with the alert at a time t.

2. The method of claim 1, further comprising retrieving information relating to a prior event from the database.

3. The method of claim 1, further comprising accumulating the alert.

4. The method of claim 1, further comprising re-evaluating an uncertainty of the alert.

5. The method of claim 1, further comprising applying a filter to determine whether to limit outputting of the alert.

6. The method of claim 1, further comprising outputting a recommendation relating to the alert.

7. The method of claim 1, wherein obtaining a status from a sensor includes obtaining a status from one of an infrared sensor, a physical sensor, a motion detection sensor, a wireless sensor, an audio pattern recognition device, a video pattern recognition device, a card reader, a biometric sensor, a software monitoring device, a trip wire, an electric eye, a pressure sensor, an access panel switch, a door switch, a microwave sensor, and a System Network Management Protocol (SNMP) trap/event message.

8. The method of claim 1, wherein outputting the alert includes outputting one of a telephone message, an electronic message, a pager message, a visual indication, and an auditory indication.

9. A system for outputting an alert, the system comprising:
  a sensor interface;
  a database; and
  an alert processor in communication with the sensor interface and the database, wherein the alert processor is configured to retrieve personnel information from the database, generate the alert, apply a filter to determine whether to modify a severity of the alert, and output the alert;
  wherein the alert processor includes an alert uncertainty and severity estimation module, the alert processor being configured to evaluate the severity of the alert to generate a modified alert severity $S_{mod}$ when it is determined to modify the severity of the alert;
  wherein the personnel information comprises identity and status information for the personnel and is related to the sensor; and
  wherein $S_{mod}=S_0+(G*N_{same})+(H*N_{adjacent})-(I*(1-C(t)))$;
  $S_0$ is a preset severity associated with the alert;
  G, H, and I are preset constants;
  $N_{same}$ is a number of alerts in an access zone within a preset time window;
  $N_{adjacent}$ is a number of alerts in access zones adjacent to the access zone within the preset time window; and
  C(t) is a certainty associated with the alert at a time t.

10. The system of claim 9, wherein the alert processor includes an alert generation module.

11. The system of claim 9, wherein the alert processor includes an input module.

12. The system of claim 9, wherein the alert processor includes a filter module.

13. The system of claim 9, wherein the alert processor includes a rule and algorithm update module.

14. The system of claim 9, wherein the alert processor includes a filter/mode selection module.

15. The system of claim 9, wherein the alert processor includes an alert output module.

16. A physical computer readable storage medium having stored thereon instructions which, when executed, cause a processor to:
  obtain a status from a sensor;
  retrieve personnel information comprising identity and status information for the personnel from a database, the personnel information relating to the sensor;
  generate an alert;
  apply a filter to determine whether to modify a severity of the alert;
  evaluate the severity of the alert to generate a modified alert severity $S_{mod}$ when it is determined to modify the severity of the alert; and
  output the alert;
  wherein $S_{mod}=S_0+(G*N_{same})+(H*N_{adjacent})-(I*(1-C(t)))$;
  $S_0$ is a preset severity associated with the alert;
  G, H, and I are preset constants;
  $N_{same}$ is a number of alerts in an access zone within a preset time window;
  $N_{adjacent}$ is a number of alerts in access zones adjacent to the access zone within the preset time window; and
  C(t) is a certainty associated with the alert at a time t.

17. The computer readable medium of claim 16, having stored thereon additional instructions that cause the processor to obtain a status from one of an infrared sensor, a physical sensor, a motion detection sensor, a wireless sensor, an audio pattern recognition device, a trip wire, an electronic eye, a pressure sensor, an access panel switch, a door switch, a microwave sensor, and a System Network Management Protocol (SNMP) trap source/event message.

18. The computer readable medium of claim 16, having stored thereon additional instructions that cause the processor to output one of a telephone message, an electronic message, a pager message, a visual indication, and an auditory indication,

* * * * *

UNITED STATES PATENT AND TRADEMARK OFFICE
CERTIFICATE OF CORRECTION

| | | |
|---|---|---|
| PATENT NO. | : 7,890,483 B1 | Page 1 of 1 |
| APPLICATION NO. | : 10/675517 | |
| DATED | : February 15, 2011 | |
| INVENTOR(S) | : Aaron et al. | |

It is certified that error appears in the above-identified patent and that said Letters Patent is hereby corrected as shown below:

<u>In the Claims</u>:
Column 13, Claim 4, Line 27: Please correct "re-evaluating " to read -- evaluating --
        Claim 9, Line 47: Please correct "sensor interface;" to read -- sensor; --
            Lines 49-50: Please correct "sensor interface" to read -- sensor --

Column 14, Claim 9, Line 2: Please correct "for the personnel"
                to read -- for personnel --
        Claim 16, Line 29: Please correct "for the personnel"
                to read -- for personnel --

Signed and Sealed this
Twenty-sixth Day of July, 2011

David J. Kappos
*Director of the United States Patent and Trademark Office*